United States Patent [19]

Inoguchi et al.

[11] 4,451,517

[45] May 29, 1984

[54] CERAMIC HONEYCOMB CATALYST SUPPORT COATED WITH ACTIVATED ALUMINA

[75] Inventors: Kazuhiro Inoguchi; Kunio Okamoto, both of Okazaki; Keiichiro Isomura, Takahama, all of Japan

[73] Assignee: Nippon Soken, Inc., Nishio, Japan

[21] Appl. No.: 398,713

[22] Filed: Jul. 15, 1982

[30] Foreign Application Priority Data

Jul. 18, 1981 [JP] Japan ................................ 56-112657

[51] Int. Cl.$^3$ ............................................... B32B 3/12
[52] U.S. Cl. .................................... 428/116; 422/180; 428/188; 502/527
[58] Field of Search ....................... 428/116, 118, 188; 252/477 R; 502/527; 422/180, 222

[56] References Cited

U.S. PATENT DOCUMENTS

| | | | |
|---|---|---|---|
| 3,839,224 | 10/1974 | Yonehara et al. | 428/116 X |
| 3,885,977 | 5/1975 | Lachman et al. | 428/116 X |
| 4,253,992 | 3/1981 | Soejima et al. | 428/116 X |
| 4,364,760 | 12/1982 | Higuchi et al. | 422/180 X |
| 4,404,007 | 9/1983 | Tukao et al. | 422/180 X |

Primary Examiner—Henry F. Epstein
Attorney, Agent, or Firm—Cushman, Darby & Cushman

[57] ABSTRACT

A catalyst support provided with an activated alumina layer which is formed on the surface of the ceramic honeycomb structure is disclosed. The catalyst support of the present invention is formed of ceramic such as cordierite, of which coefficient of thermal expansion is lower than alumina and is provided with microcracks which occur when the honeycomb structure is formed. The activated alumina layer is formed on the surface of the catalyst support without filling the microcracks occurred therein. For example, the activated alumina layer is formed by adhering the activated alumina particulates to the surface of the honeycomb structure and firing the structure together with the activated alumina particulates after the microcracks occurred in the honeycomb structure are filled with such a material as to be burnt away at a temperature lower than the sintering temperature of activated alumina.

5 Claims, 5 Drawing Figures

CERAMIC HONEYCOMB CATALYST SUPPORT COATED WITH ACTIVATED ALUMINA

BACKGROUND OF THE INVENTION

The present invention relates to a ceramic honeycomb structure coated with activated alumina, which is used as a catalyst support for purifying exhaust gases.

FIG. 1 illustrates a conventional ceramic honeycomb structure 1 which has been employed as a catalyst support for purifying exhaust gases discharged from a vehicle or the like.

The ceramic honeycomb structure 1 is superior to a pellet type support in that the attrition of the structure 1 is small, that the heat capacity of the structure 1 is small so as to be easily warmed up, that the flowing resistance of the structure 1 is small and that the exhaust gas purifying device can be made small and light.

However, the specific surface area of the honeycomb structure 1 which is generally composed of ceramic such as cordierite, is about 1 m²/g which is smaller than that of the pellet type support, so that the catalyst cannot be uniformly distributed on the support of the honeycomb structure 1.

In order to overcome the above defect, the activated alumina is coated on the honeycomb support to increase the specific surface area thereof and the catalyst is distributed on the coated surface.

In this case, the honeycomb structure 1 can be coated with activated alumina by several methods. For example, according to one method, the honeycomb structure 1 is soaked into an aluminium salt water solution bath so as to be sufficiently impregnated with aluminium salt, and the structure 1 is dried and fired so that a film of activated alumina is formed on the surface of the honeycomb structure 1. According to another method, the honeycomb structure 1 is soaked into a slurry bath which is formed by adding aluminium hydroxide powder to an aluminium salt water solution containing ammonia water, sodium hydroxide or potassium hydroxide so that aluminium hydroxide is deposited, and the structure 1 is dried and fired so that a film of activated alumina is formed on the honeycomb structure 1. According to still another method, the honeycomb structure 1 is soaked into a slurry bath which is formed of activated alumina powder or aluminium hydroxide powder which can easily transform into activated alumina by firing, a binder such as alumina sol and/or carboxy methyl cellulose and an auxiliary agent for adjusting the pH value so that the activated alumina powder or the aluminium hydroxide powder is adhered to the surface of the honeycomb structure by the operation of the binder, and the structure 1 is dried and fired so that a film of activated alumina is formed.

The ceramic honeycomb structure 1 for use as a catalyst support is formed of mullite, spodumen or the like as well as cordierite.

The ceramic honeycomb structure as shown in FIG. 1 is obtained by extruding a ceramic batch material into a honeycomb, then firing and cooling the obtained honeycomb body. In the cooling step, fine cracks are apt to be formed.

When the catalyst support formed of the ceramic honeycomb structure is used, it is subjected to a large number of heating and cooling cycles when repeatedly exposed to passing exhaust gases. Therefore, the catalyst support is required to have a low coefficient of thermal expansion in order to prevent the occurrence of cracks due to thermal shock.

U.S. Pat. No. 3,885,977 discloses a honeycomb structure having an especially low thermal expansion property in the extruding direction.

In the honeycomb structure having a low thermal expansion property in one direction, a large internal stress generates in the above-described cooling step after the firing step. As a result, fine cracks of $0.5\mu$ or less in width (hereinafter, will be called microcracks) are formed.

On the surface of the ceramic sintered body, a larger number of concave portions (of which the width is larger than that of the microcracks and is more than $0.5\mu$) exist. These concave portions will be called macropores.

FIG. 2 illustrates the surface of the ceramic sintered body 1a. The reference numberal 2 designates the macropore and the reference numeral 3 designates the microcrack.

After many studies and experiments by the present inventors, it was confirmed that since the width of the microcracks was decreased when the honeycomb structure was heated again, the microcracks served as buffer zones which absorbed the thermal expansion of the honeycomb structure to prevent damage thereof.

And the present inventors have found that by coating a honeycomb support formed of the material such as cordierite, which has a coefficient of thermal expansion lower than that of activated alumina, with activated alumina, the activated alumina fills the macropores to increase the coefficient of thermal expansion of the surface portion of the honeycomb support. Moreover, activated alumina also fills the microcracks to obstruct the above-described operation of the microcracks as buffer zones and as a result serves to crack the honeycomb structure due to the development of the microcracks.

When the support formed of the ceramic sintered honeycomb structure, having a coefficient of thermal expansion smaller than that of activated alumina, is coated with activated alumina, the coefficient of thermal expansion of the support increases while the thermal shock resistance lowers. This phenomena results from the fact that the activated alumina, having a coefficient of thermal expansion larger than that of the support, enters the above-described microcracks 3 and the macropores 2.

The activated alumina entering the microcracks 3 acts as a wedge to promote the further development and propagation of the microcracks 3. As a result, the thermal shock resistance lowers further.

Accordingly, one object of the present invention is to provide a honeycomb structured catalyst support coated with activated alumina, of which coefficient of thermal expansion is smaller and thermal shock resistance is more excellent as compared with the conventional support.

Another object of the present invention is to provide a honeycomb structured catalyst support coated with activated alumina, of which fine cracks formed in the surface portion thereof are maintained without being filled with activated alumina thus leaving the unfilled fine cracks free to absorb the thermal expansion of the catalyst support.

DESCRIPTION OF THE DRAWINGS

Other objects and advantages of the invention will become apparent from the following description of embodiments thereof with reference to the accompanying drawings wherein.

SUMMARY OF THE INVENTION

The catalyst support of the present invention is provided with an activated alumina layer which is formed on the surface of the ceramic honeycomb structure.

The catalyst support of the present invention is formed of ceramic such as cordierite, of which coefficient of thermal expansion is lower than alumina and is provided with microcracks which were formed in the cooling step after the firing step.

And the activated alumina layer is formed on the surface of the catalyst support without filling the microcracks formed therein.

The activated alumina layer is formed by adhering the activated alumina particulates to the surface of the honeycomb structure and firing the structure together with the activated alumina particulates after the microcracks formed in the honeycomb structure are filled with such a material as to be burnt away at a temperature lower than the sintering temperature of activated alumina.

Furthermore, the present invention provides a catalyst support wherein the macropores of the honeycomb structure are filled with ceramic material of which coefficient of thermal expansion is lower than that of activated alumina without filling the microcracks formed therein, and on the surface of the honeycomb structure of which macropores are filled with the ceramic material, an activated alumina layer is formed. In this case, the activated alumina layer is formed by filling the microcracks with such a material as to be burnt away at a temperature lower than the sintering temperature of activated alumina, filling the macropores with cordierite powder, coating the surface of the honeycomb structure with activated alumina particulates and firing the obtained honeycomb structure, for example.

DETAILED DESCRIPTION OF THE INVENTION

Hereinafter, the present invention will be explained in detail in accordance with the embodiments thereof.

Embodiment 1

A batch was prepared by kneading kaoline, talc and aluminium hydroxide, which are main ingredients, together with water and a binder.

Figure 1:
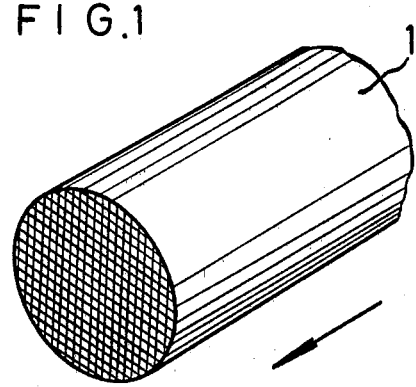
FIG. 1 is a view illustrating a conventional honeycomb structure made of a ceramic sintered body.

The obtained batch was extruded by an extrusion die and the extruded honeycomb was dried, fired and cooled to form a cordierite honeycomb structure as shown in FIG. 1.

The minimum coefficient of thermal expansion of the honeycomb structure in the extrusion direction (the direction of the arrow shown in FIG. 1) was $9.0 \times 10^{-7}/°C.$ at a temperature range from 25° to 1000° C.

Figure 2A:
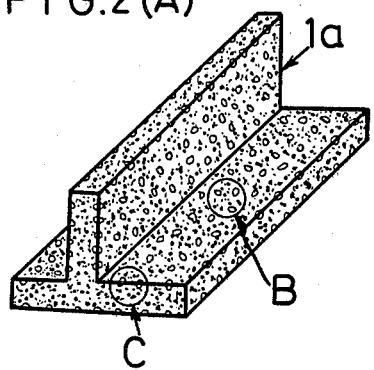
FIGS. 2(A), 2(B), 2(C) are views illustrating a ceramic sintered body, microcracks and macropores formed in the ceramic sintered body.
Figure 2B:
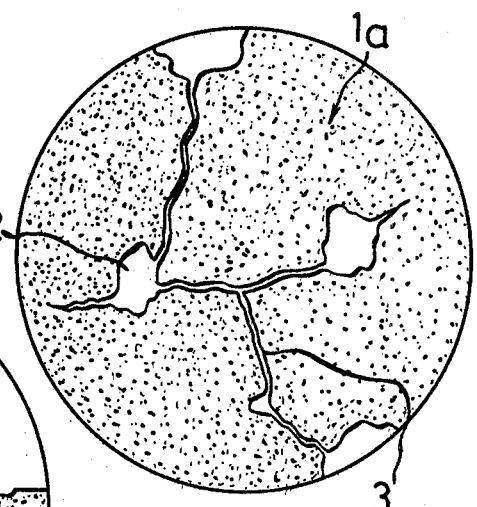
Figure 2C:
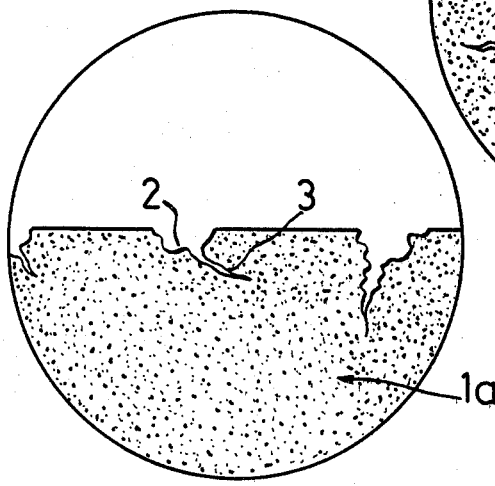

The obtained honeycomb structure was provided with a large number of macropores 2 of which diameter was larger than $0.5\mu$, on the surface thereof as shown in FIG. 2.

And the microcracks 3 of which the width was smaller than $0.5\mu$ and mostly distributed from 0.1 to $0.2\mu$, were mainly formed from the bottom of the macropores 2. The microcracks were also formed emanating from the flat surface of the obtained honeycomb structure.

The obtained honeycomb structure was soaked in a solution containing 0.5% methyl cellulose, and dried at 80° C. for 120 minutes so as to fill the microcracks 3. As a result, a film of gelatinized methyl cellulose on the honeycomb structure was formed.

Figure 3:
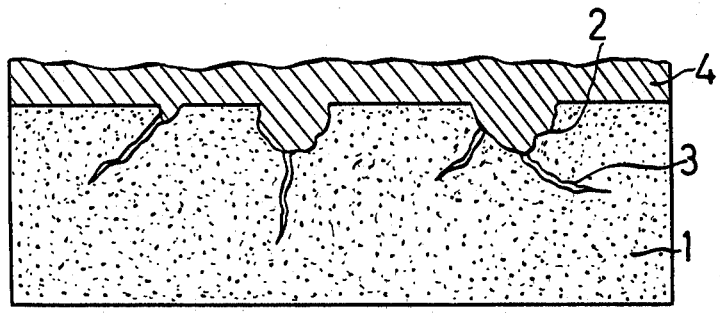
FIGS. 3 and 4 are sectional views illustrating the surface portion of the catalyst support according to the present invention, wherein an activated alumina coating layer is formed, respectively.

Next, a slurry was prepared by mixing together activated alumina particulates of which the average particle diameter was $1.6\mu$, alumina sol of which average particle diameter was 0.1 to $0.05\mu$, and aluminium nitrate for adjusting pH value. Into the prepared slurry, the honeycomb structure on which the methyl cellulose film was previously formed, was soaked, dried at 110° C. and fired at 600° C. As a result, the gelatinized methyl cellulose filling the microcracks 3 was burnt away and on the surface of the honeycomb structure 1, an activated alumina coating layer 4 was formed so as to fill the macropores 2 as shown in FIG. 3.

Thus, the hollow microcracks 3 were obtained.

One sample 10 mm in diameter and 50 mm in length was cut out from the obtained honeycomb support coated with activated alumina.

The coefficient of thermal expansion of the sample in the extrusion direction was $10.8 \times 10^{-7}/°C.$ at a temperature range of 25° to 1000° C.

The obtained honeycomb support was installed in an exhaust system of a 2000 cc engine and a durability test was carried out.

The cycle consisted of the engine stopping for seven minutes, idling (1000 rpm) for one minute, full throttle driving (4600 rpm) for seven minutes and idling (1000 rpm) for one minute, and was repeated 2000 times.

The temperature of the inlet side of the honeycomb support was 100° C. at the lowest at an engine stopping time and 700° C. at the highest at a full throttling time.

As a result of the above test, the development of the cracks was not observed in the honeycomb support and the coating layer did not peel off from the support.

For comparison, the honeycomb structure which was formed in the same manner as described above, was directly coated with activated alumina without forming the above described film therebetween.

And the surface portion of the obtained conventional support was observed by means of an electron microscope.

Figure 5:
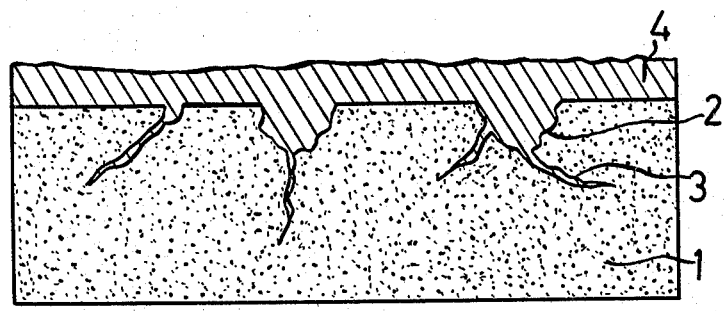
FIG. 5 is a sectional view illustrating the surface portion of the conventional catalyst support wherein an activated alumina coating layer is formed.

As shown in FIG. 5, the macropores 2 and the microcracks 3 were completely filled with the coating material And another sample having the same shape and the same size as those of the sample of the first embodiment was cut out from the above conventional honeycomb support. The coefficient of thermal expansion of this sample in the extrusion direction was $14.2 \times 10^{-7}/°C.$ at a temperature range of 25 to 1000° C.

Furthermore, the durability of the above conventional honeycomb support was tested in the same manner as described above for comparison.

As a result of the durability test, new cracks were observed at the 500th cycle. Then, the honeycomb support was taken away from the exhaust system and pressed by hand. As a result, the conventional honeycomb support was easily broken along the cracks. The durability test was carried out while checking the condition of the sample every 100 cycle. Therefore, it is considered that the cracks were formed between 400th and 500th cycle.

Embodiment 2

The honeycomb structure which was obtained by the same method as that of Embodiment 1, was soaked in a slurry bath which was formed by mixing cordierite particulates of which the average particle diameter was 2.2$\mu$ and the minimum particle diameter was larger than 0.5$\mu$, and methyl cellulose so that the macropores were filled with the slurry and the microcracks of which width was smaller than 0.5$\mu$, were filled with methyl cellulose. Then, the honeycomb structure was taken out of the slurry bath and dried at 80° C. to form a film of the slurry.

Figure 4:
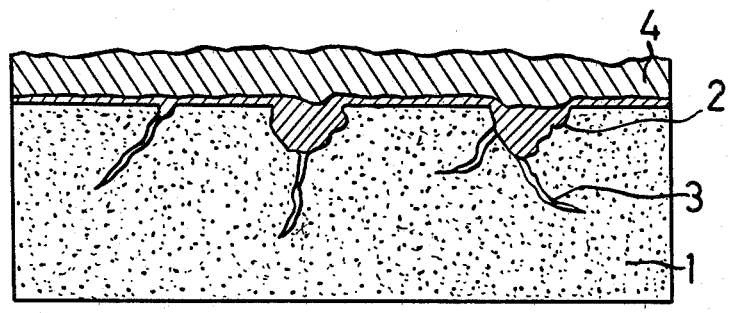

Next, on the film of the slurry, an activated alumina layer was formed by the same method as that of Embodiment 1. As a result, as shown in FIG. 4, hollow microcracks 3 were formed. And the micropores 2 were filled with cordierite particulates while on the other surface portion of the honeycomb structure, a thin cordierite layer is formed.

And on the cordierite layer formed on the honeycomb structure, an activated alumina layer 4 was formed. The activated alumina coating material did not enter the macropores 2.

From the honeycomb support which was produced by this method, one sample having the same shape and size as those of Embodiment 1 was cut out. The coefficient of thermal expansion in the extrusion direction was 9.4×10$^{-7}$/°C.

The durability of the honeycomb support of the second embodiment was tested in the same manner as that of the first embodiment.

As a result, the development of cracks in the honeycomb support and peeling of the activated alumina coating layer were not observed.

As described above, the present invention provides a honeycomb support provided with an activated alumina coating layer which is formed on the surface of the ceramic honeycomb structure without filling the cracks generated within the structure in the forming step thereof.

As compared with the conventional honeycomb support of which microcracks are filled with activated alumina, the honeycomb support of the present invention exhibits a low coefficient of thermal expansion.

And since the microcracks of the honeycomb support of the present invention are not filled with activated alumina, the microcracks act as buffer zones which absorb the deformation of the honeycomb support due to expansion thereof when being heated.

Therefore, the honeycomb support according to the present invention, exhibits remarkably improved thermal shock resistance as compared with the conventional honeycomb support.

Accordingly the present invention provides a catalyst support composed of a honeycomb structure on which an activated alumina coating layer is formed so that the microcracks thereof are hollow, the macropores thereof being filled with the material having a coefficient of thermal expansion lower than that of activated alumina.

By filling the macropores with the material having a relatively lower coefficient of thermal expansion, the coefficient of thermal expansion of the honeycomb support can be made smaller.

As described in the preamble of this specification, the ceramic honeycomb structure support has various advantages over other supports.

However, since this support is formed of fragile ceramic and is composed of thin walls defining a plurality of open passages, high thermal shock resistance thereof cannot be obtained.

The present invention provides an effective measure for improving the thermal shock resistance of the ceramic honeycomb structured support.

Having now fully described the invention, it will be apparent to one of ordinary skill in the art that many changes and modifications can be made thereto without departing from the spirit or scope of the invention as set forth herein.

What is claimed is:

1. A ceramic honeycomb catalyst support having a honeycomb structure with an activated alumina coating thereon, adapted for purifying exhaust gases and exhibiting improved resistance to thermal shock, said honeycomb structure formed of a ceramic material having a coefficient of thermal expansion below that of activated alumina, said honeycomb structure having a matrix of thin walls forming a multiplicity of open ended cells or passages defined by the thin walls extending from one end of the honeycomb to the other end, said honeycomb structure having in the surface walls thereof a multiplicity of minute pores and a multiplicity of fine cracks of a width smaller than said minute pores, said fine cracks and minute pores formed during the fabrication of the honeycomb structure, and a layer of activated alumina adhered onto the surfaces of said thin walls, said fine cracks being substantially completely devoid of said activated alumina such that the area within said fine cracks is unfilled and are free to act as buffer zones to absorb deformation of the honeycomb structure as it expands when heated.

2. The ceramic honeycomb catalyst support according to claim 1 in which said minute pores only are filled with a ceramic having a coefficient of thermal expansion lower than that of said activated alumina and said activated alumina coating adhered to the thin walls of the structure is also adhered to said ceramic filling exposed at the surface of said minute pores.

3. The ceramic honeycomb catalyst support according to claim 1 in which said minute pores are greater than about 0.5 microns in diameter and said fine cracks are not greater than about 0.5 microns.

4. The ceramic honeycomb catalyst support according to claim 1 in which said honeycomb structure is formed of cordierite, mullite or spodumen.

5. The ceramic honeycomb catalyst support according to claim 2 in which said ceramic filling said minute pores is cordierite, spodumen, eucryptite, aluminum titanate or mullite.

* * * * *